United States Patent [19]

Verton

[11] Patent Number: 4,592,110
[45] Date of Patent: Jun. 3, 1986

[54] WIPER ASSEMBLY FOR MOTOR VEHICLES

[75] Inventor: José Verton, Saint-Vincent, Belgium

[73] Assignee: Champion Spark Plug Europe S.A., Virton, Belgium

[21] Appl. No.: 648,303

[22] Filed: Sep. 7, 1984

[30] Foreign Application Priority Data

Sep. 13, 1983 [FR] France .................. 83 14533

[51] Int. Cl.$^4$ .................................... B60S 1/32
[52] U.S. Cl. .................. 15/250.35; 15/250.42
[58] Field of Search .............. 15/250.32–250.42

[56] References Cited

U.S. PATENT DOCUMENTS

| 1,613,319 | 1/1927 | Fuchs | 15/250.35 X |
|---|---|---|---|
| 3,131,414 | 5/1964 | Wise | 15/250.42 |
| 3,176,337 | 4/1965 | Glynn | 250/ |
| 3,480,986 | 12/1969 | Forster | 250/ |
| 3,665,544 | 5/1972 | Sakamoto | 250/ |
| 3,978,543 | 9/1976 | Tomlin | 15/250.42 |

FOREIGN PATENT DOCUMENTS

| 1087482 | 8/1960 | Fed. Rep. of Germany ... 15/250.35 |
|---|---|---|
| 2114102 | 4/1972 | Fed. Rep. of Germany . |
| 1033521 | 7/1953 | France . |
| 2212803 | 7/1974 | France . |
| 1409802 | 7/1984 | France . |

Primary Examiner—Peter Feldman
Attorney, Agent, or Firm—Wood, Dalton, Phillips, Mason & Rowe

[57] ABSTRACT

A wiper assembly is disclosed and has a wiper arm mounted on a drive shaft, a wiping element in wiping contact with a surface to be wiped, a pressure distributing rod or flexor slidably attached to the wiping element for reinforcing the wiping element, and leaf springs linking the wiper arm with the pressure distributing rod or flexor. The leaf springs may be integral with the arm and slidably connected to the rod or flexor by claws or may be integral with the rod or flexor and slidably connected to the arm. The parts of the wiper assembly may all be made of plastic. When the arm is made of plastic, a preshaped reinforcing blade may be part of the arm for assisting in conforming the wiping element to the surface to be wiped.

15 Claims, 16 Drawing Figures

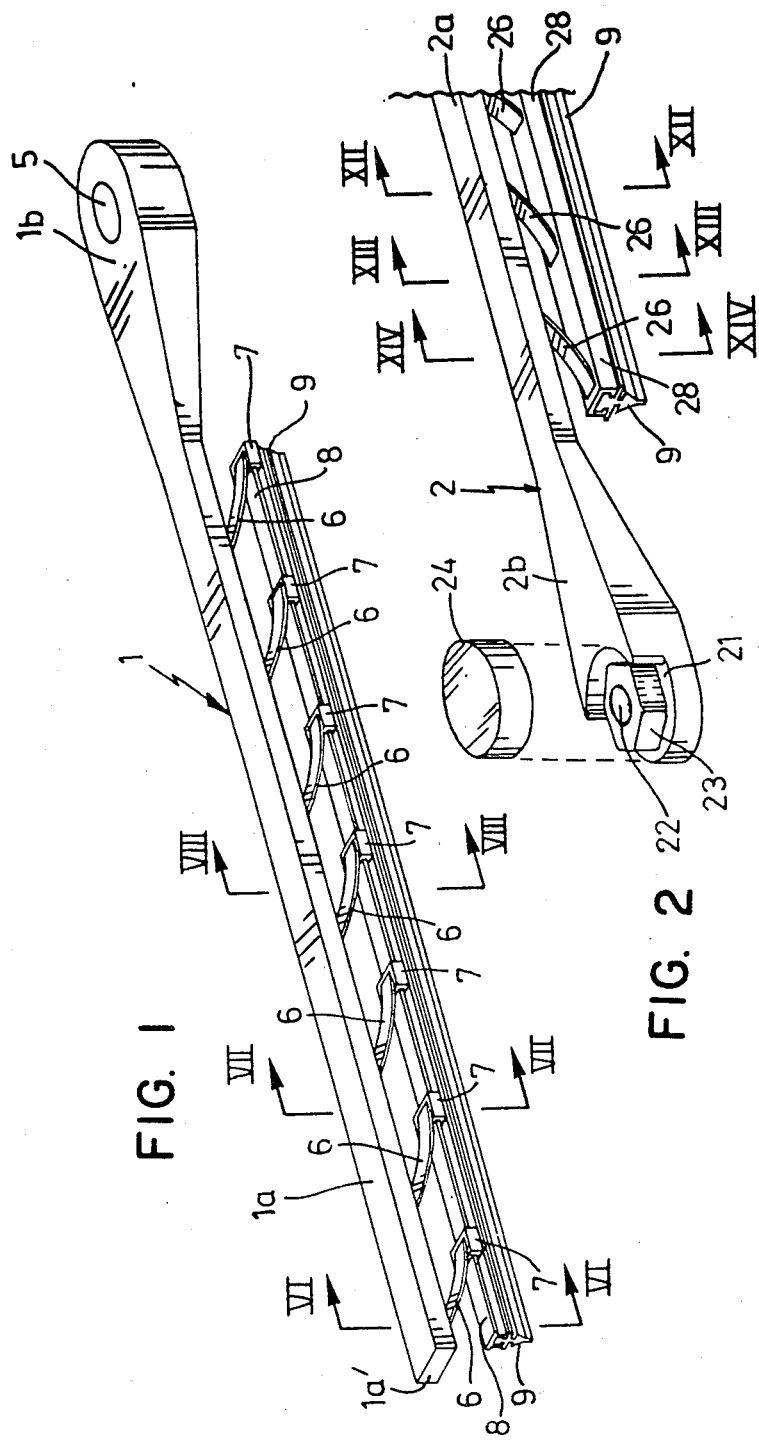

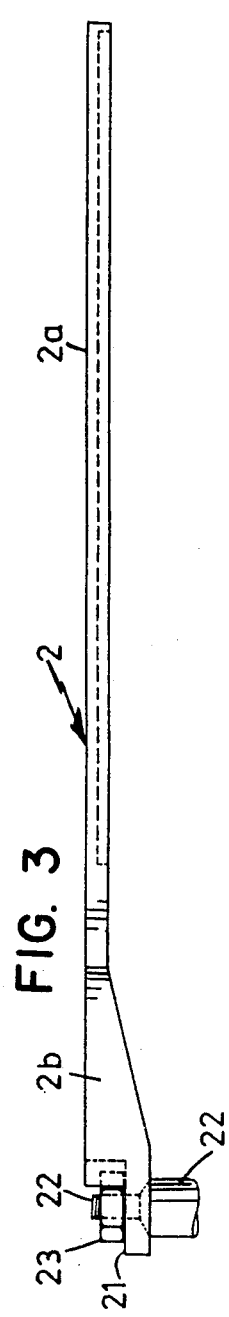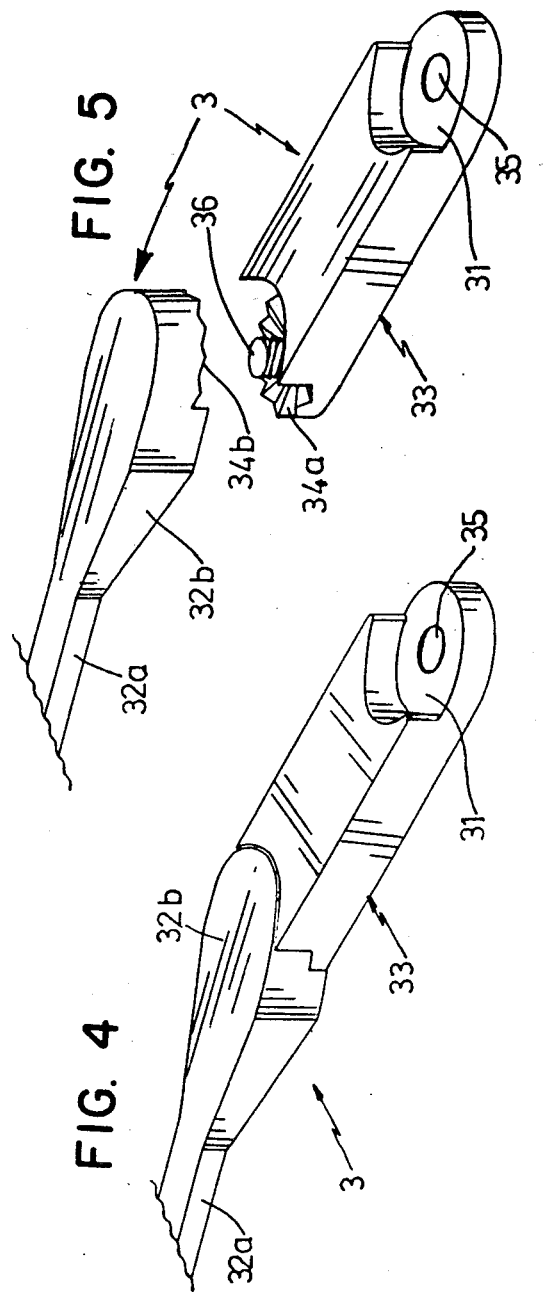

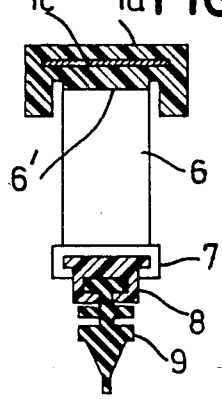
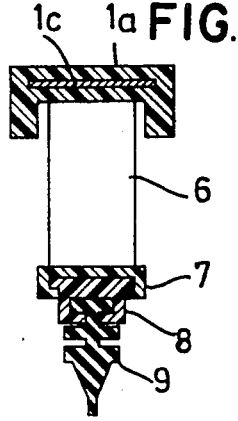
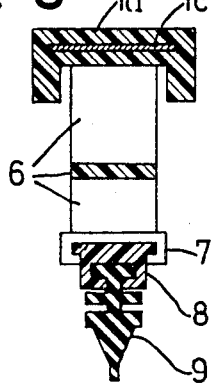
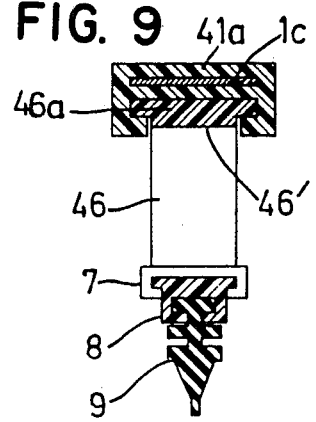
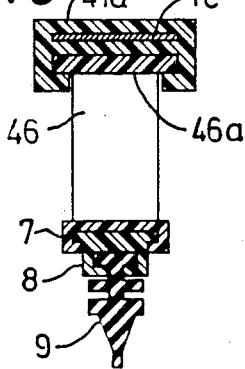
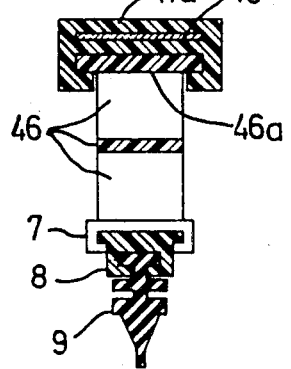

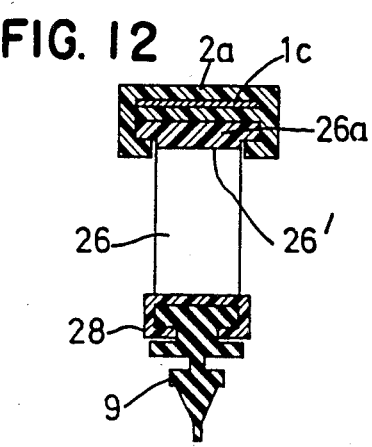
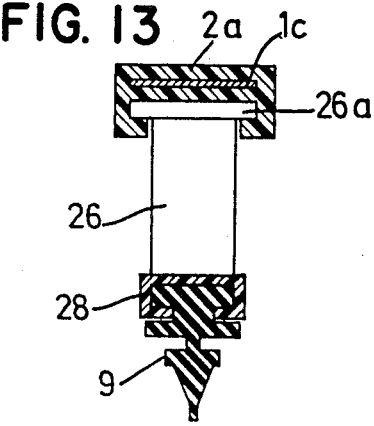
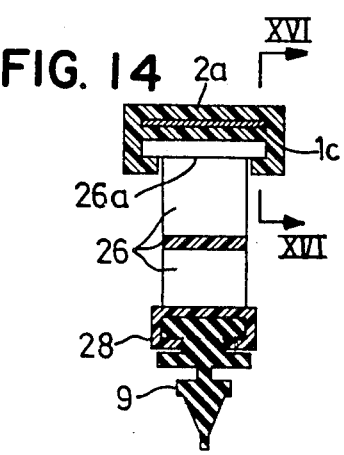
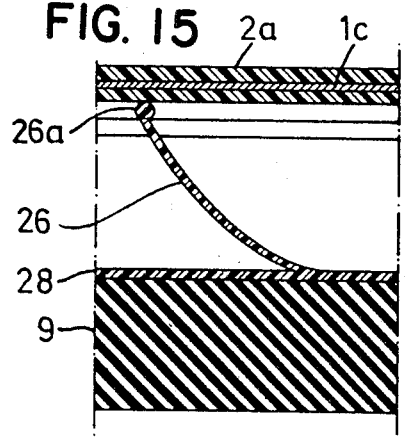
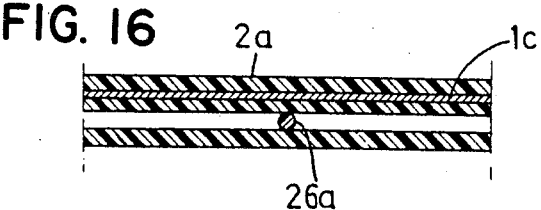

WIPER ASSEMBLY FOR MOTOR VEHICLES

DESCRIPTION

1. Field of the Invention

The present invention relates to a wiper assembly, in particular for motor vehicles, comprising a wiper arm and a wiping element reinforced by a pressure distributing rod.

2. Background of the Prior Art

Wiper assemblies which comprise the three above mentioned elements are well known in prior art and in fact most known wiper assemblies comprise said three elements.

However, practically all known wiper assemblies comprise numerous other elements, so that such assemblies become rather complex, i.e. expensive as to the material used and as to the time and machines needed for assembling them. Moreover, the more a system is complex, the greater are the risks of failure, i.e. of inefficiency.

The wiper assemblies known in prior art generally comprise: (a) a wiper arm, (b) a wiping element reinforced by (c) a pressure distributing rod (or blade) and linked to (d) a superstructure, which in turn is linked to the wiper arm by (e) a connector. The superstructure generally comprises several (f) bridges or yokes which are linked together by (g) articulation means. Thus the wiper assemblies known in prior art may easily comprise 7 different types of elements.

SUMMARY OF THE INVENTION

The object of the present invention is to provide a wiper assembly comprising the least possible elements and therefore to reduce the costs for material and assembly, more particularly for a wiper assembly to be used on surfaces of which the curvature is not too important, such as, for example, the rear windows of motor vehicles.

The wiper assembly according to the invention is substantially characterized by the fact that said pressure distributing rod is linked to the wiper arm by a plurality of leaf springs. Depending on the embodiment, the wiper assembly according to the invention is also characterized either by the fact that the wiper arm and the leaf springs are made in one piece, or by the fact that the pressure distributing rod and the leaf springs are made in one piece.

Other characteristics and advantages of the wiper assembly according to the invention will be better understood when reading the following portions of the description of several embodiments of the invention in conjunction with the appended drawings.

DESCRIPTION OF THE DRAWINGS

FIG. 1 shows the wiper assembly according to a first and second embodiment of the invention;

FIG. 2 shows the wiper assembly according to a third embodiment of the invention;

FIG. 3 is an elevational view of the wiper arm of FIG. 2;

FIG. 4 shows a variant of the wiper arm of FIGS. 1 and 2;

FIG. 5 shows a detail of the variant of the wiper arm of FIG. 4;

FIG. 6 is a section along line VI—VI of FIG. 1 and according to the first embodiment of the invention;

FIG. 7 is a section along line VII—VII of FIG. 1 and according to the first embodiment of the invention;

FIG. 8 is a section along line VIII—VIII of FIG. 1 and according to the first embodiment of the invention;

FIG. 9 is a section along line VI—VI of FIG. 1 and according to the second embodiment of the invention;

FIG. 10 is a section along line VII—VII of FIG. 1 and according to the second embodiment of the invention;

FIG. 11 is a section along line VIII—VIII of FIG. 1 and according to the second embodiment of the invention;

FIG. 12 is a section along line XII—XII of FIG. 2 and according to the third embodiment of the invention;

FIG. 13 is a section along line XIII—XIII of FIG. 2 and according to the third embodiment of the invention;

FIG. 14 is a section along line XIV—XIV of FIG. 2 and according to the third embodiment of the invention;

FIG. 15 is a partial section along the central longitudinal plane of the wiper assembly of FIG. 2 and according to the third embodiment of the invention;

FIG. 16 is a partial section along line XVI—XVI of the wiper arm of FIG. 14.

DESCRIPTION OF THE PREFERRED EMBODIMENTS

As mentioned above and as explained hereunder, FIG. 1 represents not one, but two embodiments of the wiper assembly according to the invention. The components of these two embodiments (first and second) are substantially the following: (a) a wiper arm 1 comprising an elongate front portion 1a which may have either a constant transverse section or a transverse section which is slightly tapered towards the free extremity of the wiper arm 1, and a relatively short rear portion 1b provided with an opening 5 into which the driving shaft 22 (FIG. 3) of the wiper arm 1 is inserted; (b) a plurality of leaf springs 6 provided, at their lower extremity, with claws 7; (c) a pressure distributing rod or flexor 8 which is linked to the leaf springs 6 by means of the claws 7 and (d) a wiping element 9 which is inserted into a longitudinal groove of the pressure distributing rod or flexor 8.

FIG. 2 shows a third embodiment of the wiper assembly according to the invention. This embodiment substantially comprises the same components as the first and the second embodiments, i.e.: (a) a wiper arm 2 comprising a front portion 2a and a rear portion 2b; (b) a plurality of leaf springs 26, which, in this embodiment, are not provided with claws at their lower extremity; (c) a pressure distributing rod or flexor 28 of which the leaf springs are an integral part and (d) a wiping element 9 which is inserted into a longitudinal groove of the pressure distributing rod or flexor 28.

FIGS. 2 and 3 schematically show how, for example, the wiper arm 2 can be attached to its driving shaft 22, i.e. the rear portion 2b of the wiper arm 2 comprises a portion of reduced thickness 21 and the driving shaft 22 is inserted into an opening provided in said portion of reduced thickness 21. The driving shaft 22 is secured to said same portion 21 by the nut 23. A cap 24 may protect the driving shaft 22 and the nut 23.

Concerning FIGS. 1 and 2, it is to be noted that the association of claws (7) with a pressure distributing rod or flexor (8) and the association of a wiping element (9) with a pressure distributing rod or flexor (8,28) are well known in prior art and it is therefore not necessary to describe them in detail.

FIGS. 4 and 5 show a variant of the wiper arms 1,2 of FIGS. 1 and 2. In this variant, the wiper arm 3 also comprises a front portion 32a and a rear portion 32b, but the rear portion 32b is not directly secured to the driving shaft (not shown in FIGS. 4 and 5). Indeed the rear portion 32b of the wiper arm 3 is extended by an elongate part 33 which is secured to the driving shaft and which, for this purpose, comprises the portion of reduced thickness 31 and the opening 35 for inserting and blocking the driving shaft.

The connection between the rear portion 32b of the wiper arm 3 and the elongate part 33 is designed in such a way that, after assembly, the longitudinal axis of the parts 32a and 32b are capable of being at a predetermined angle with the elongate part 33. The advantage of this feature is that the wiper arm 3 may be adapted to, for example, different configurations of the rear window of a motor vehicle, including the position of the driving shaft 22 with respect to said rear window.

The detail of the connection between the rear portion 32b of the wiper arm 3 and the elongate part 33 is shown in FIG. 5 wherein it can be seen that said connection comprises an indented, circular portion of reduced thickness 34a, 34b not only on the rear portion 32b of the wiper arm 3, but also on the elongate part 33, as well as a screw 36 which is inserted from below into an opening provided in the center of the indented portion 34a of the elongate part 33. Once the angle between the part 32a, 32b and the part 33 has been chosen, the indented portion 34b of the rear portion 32b of the wiper arm 3 is lowered onto the indented portion 34a of the elongate part 33 and the screw 36 is screwed into a thread (not shown) provided in the center of the indented portion 34b of the rear portion 32b of the wiper arm 3.

It is to be noted at this point that, to the contrary of most conventional wiper arms, the wiper arm according to the invention is not provided with a helical spring (tension or compression spring) in its rear portion 1b, 2b, 32b. Indeed the necessary pressure for a good wipe effect is transferred to the wiping element 9 either only by the leaf springs 6,26 or possibly, as explained hereunder, also by a prestressed, resilient, metallic blade extending longitudinally inside the wiper arm 1,2, 32a, 32b which principally is made of an appropriate plastic material.

This feature of the wiper arm according to the invention, i.e. the fact that it is not provided with a helical spring, is an important advantage because the presence of a helical spring in the rear portion of a wiper arm implies a relatively complex and expensive construction.

FIGS. 6, 7 and 8 are transverse sections of the front portion 1a of the wiper arm 1 of the wiper assembly according to the first embodiment of the invention (FIG. 1). The main characteristic of this first embodiment is the fact that the wiper arm 1, the leaf springs 6 and the claws 7 are made in one piece which, for example, is made of an appropriate plastic material.

FIG. 6 is a section along line VI—VI of FIG. 1, i.e. a section of the point 6' where one of the leaf springs 6 joins the front portion 1a of the wiper arm 1. FIG. 7 is a section along line VII—VII of FIG. 1, i.e. in the area of one of the claws 7. FIG. 8 is a section along line VIII—VIII of FIG. 1, i.e. substantially in the area of the center portion of one of the leaf springs 6.

For mounting the wiper assembly according to this first embodiment, it is sufficient to (a) insert the wiping element 9 into the longitudinal groove provided for this purpose in the pressure distributing rod or flexor 8 and (b) insert the pressure distributing rod or flexor 8 into the claws 7 of the leaf springs 6.

In order to avoid the longitudinal disengagement of the pressure distributing rod or flexor 8 from the claws 7 when the wiper assembly is working, one can foresee, for example, one or more welding points at one or the other contact surfaces between one of the two outward claws 7 and the pressure distributing rod or flexor 8.

FIGS. 9, 10 and 11 are transverse sections of the front portion of the wiper arm of the wiper assembly according to the invention (FIG. 1). The main characteristic of this second embodiment is the fact that the leaf springs 46 are linked to the front portion 41a of the wiper arm by means of a lath or flange 46a located in a longitudinal groove of said portion 41a of the wiper arm.

FIG. 9 is a section along line VI—VI of FIG. 1, i.e. a section at the point 46' where on the leaf springs 46 joins said lath or flange 46a. FIG. 10 is a section along line VII—VII of FIG. 1, i.e. in the area of one of the claws 8. FIG. 11 is a section along line VIII—VIII of FIG. 1, i.e. substantially in the area of the center portion of one of the leaf springs 46.

For mounting the wiper assembly according to this second embodiment, it is sufficient to (a) insert the wiping element 9 into the longitudinal groove provided for this purpose in the pressure distributing rod or flexor 8 and (b) insert said lath or flange 46a into the longitudinal groove provided for this purpose in the front portion 41a of the wiper arm. FIGS. 9, 10 and 11 show that the groove provided in the front portion 41a of the wiper arm has substantially the form of a T just as the groove provided in the pressure distributing rod or flange 8 into which the wiping element 9 is inserted.

FIGS. 12, 13 and 14 are transverse sections of the front portion 2a of the wiper arm 2 of the wiper assembly according to the third embodiment of the invention (FIG. 2). The main characteristic of this third embodiment is the fact that (a) each leaf spring 26 is linked to the front portion 2a of the wiper arm 2 by means of a cylindrical part 26a located in a longitudinal, T-shaped groove of said portion 2a of the wiper arm 2 and (b) all the leaf springs 26 are an integral part of the pressure distributing rod or flexor 28.

FIG. 12 is a section along line XII—XII of FIG. 2, i.e. a section at the point 26' where one of the leaf springs 26 joins one of said cylindrical parts 26a. FIG. 13 is a section along line XIII—XIII of FIG. 2, i.e. a section located between the points where two successive leaf springs 26 join the corresponding cylindrical parts 26a and between the points where said same successive leaf springs 26 join the pressure distributing rod 28. FIG. 14 is a section along line XIV—XIV of FIG. 2, i.e. substantially in the area of the center portion of one of the leaf springs 26.

FIG. 15 is a partial section along the central longitudinal plane of the wiper assembly of FIG. 2 and FIG. 16 is a partial section along line XVI—XVI of FIG. 14. These two sections more particularly show the position of the cylindrical part 26a with respect to the other elements of the wiper assembly according to the third embodiment of the invention.

As can be seen in FIGS. 6 through 16, the wiper arm of all embodiments of the invention can be reinforced by a resilient metallic blade 1c which, at the same time, may act as a supplementary spring for biasing the wiping element 9 with a sufficient force against the surface to be wiped. For this purpose, said resilient metallic blade 1c is mounted inside the wiper arm with an initial curvature. The effect of said blade 1c will be strongest at the free extremity of the wiper arm, which feature can be of advantage if the corresponding area of the surface to be wiped has a certain curvature.

It is to be noted that, independently of the resilient metallic blade, the wiping element 9 is capable of adapting itself up to a certain point to the curvature of the surface to be wiped. Indeed: (a) the assembly wiping element 9/pressure distributing rod or flexor 8,28 is flexible in all three embodiments of the invention; (b) in the first and in the second embodiment, the claws 7 can slightly slide along the pressure distributing rod or flexor 8 (except for one of the outward claws); (c) in the third embodiment, the cylindrical parts 26a may slightly move longitudinally inside the T-shaped groove of the front portion 2a of the wiper arm 2.

Three embodiments of a new invention have thus been described, but it is quite evident that the invention is not limited to these embodiments. Indeed, modifications and/or changes may be made without departing from the scope of the invention such as defined in the appended claims.

I claim:

1. A wiper assembly, in particular for motor vehicles, comprising an elongate wiper arm having means for connecting the wiper arm to a driving shaft, a resilient wiping element reinforced by a pressure distributing rod or flexor, characterized in that a plurality of separate and longitudinally spaced elongate leaf springs are provided, each having spaced ends, means attach one end of each of the plurality of springs substantially fixedly to the wiper arm so that the attached end of each of the plurality of springs cannot move relative to the wiper arm at a plurality of longitudinally spaced points on said arm, and means attach the other end of each of the plurality of springs to the flexor at a plurality of longitudinally spaced points on the flexor said leaf springs being substantially parallel with each other and transmitting wiper arm pressure directly to said flexor.

2. A wiper assembly according to claim 1, characterized in that the wiper arm and the leaf springs are made in one piece.

3. A wiper assembly according to claim 1, characterized in that each leaf spring at the extremity which is closest to the pressure distributing rod or flexor is provided with a pair of claws.

4. A wiper assembly according to claim 3, characterized in that the wiper arm, the leaf springs and the claws are made in one piece.

5. A wiper assembly, in particular for motor vehicles, comprising an elongate wiper arm, a resilient wiping element reinforced by a pressure distributing rod or flexor, characterized in that a plurality of separate and longitudinally spaced leaf springs link said pressure distributing rod or flexor to the wiper arm at a plurality of longitudinally spaced points on said flexor and on said arm, said leaf springs being substantially parallel with each other and transmitting wiper arm pressure directly to said flexor, wherein the leaf springs are linked to the wiper arm by means of a lath or flange extending sidewardly therefrom, and a pair of facing longitudinal grooves formed in the underside of said wiper arm, said lath or flange on said leaf spring seating in said longitudinal grooves in the wiper arm.

6. A wiper assembly according to claim 5, characterized in that said lath or flange and the leaf springs are made in one piece.

7. A wiper assembly, in particular for motor vehicles, comprising a wiper arm, a resilient wiping element, a pressure distributing flexor mounted on the wiping element, spring means for connecting said pressure distributing flexor to the wiper arm, said spring means comprising at least two longitudinally spaced leaf springs, each leaf spring having a cylindrical part on one end portion extending outwardly on each side of the leaf spring, said wiper arm having a longitudinal groove extending along at least one portion of the wiper arm, the cylindrical parts of each leaf spring nesting in the groove in the wiper arm to operatively connect the flexor and wiping element to the arm.

8. A wiper assembly according to claim 5 wherein the transverse section of said longitudinal groove of the wiper arm is substantially T-shaped.

9. A wiper assembly according to claim 7, characterized in that said cylindrical parts, the leaf springs and the pressure distributing flexor are made in one piece.

10. A wiper assembly according to claim 1, characterized in that the wiper arm, leaf springs and rod or flexor are made of an appropriate plastic material.

11. A wiper assembly according to claim 10, characterized in that the wiper arm is reinforced by a metallic blade extending longitudinally in the plastic material of the wiper arm.

12. A wiper assembly according to claim 1, characterized in that the wiper arm has at its extremity, which is opposite to its free extremity, an elongate part of which the longitudinal axis is at a predetermined angle with respect to the longitudinal axis of the wiper arm.

13. A wiper assembly according to claim 7 wherein each leaf spring has a pair of claws on the other end portion, said claws operatively engaging said flexor for connecting said arm to said blade.

14. A wiper assembly according to claim 13 wherein at least one of said claws in retained affixed to said flexor against longitudinal movement.

15. A wiper assembly according to claim 13 wherein means are provided for retaining said claws on the leaf springs assembled with said flexor.

* * * * *